US011065739B2

(12) United States Patent
Dawdy et al.

(10) Patent No.: US 11,065,739 B2
(45) Date of Patent: Jul. 20, 2021

(54) VEHICLE COMPONENT PAINTING SYSTEM AND METHOD

(71) Applicant: MAGNA MIRRORS OF AMERICA, INC., Holland, MI (US)

(72) Inventors: Steven E. Dawdy, Rockford, MI (US); Loren G. Ulrey, Twin Lake, MI (US); Aaron R. Slupe, Ada, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 254 days.

(21) Appl. No.: 16/002,042

(22) Filed: Jun. 7, 2018

(65) Prior Publication Data

US 2018/0354101 A1     Dec. 13, 2018

Related U.S. Application Data

(60) Provisional application No. 62/516,278, filed on Jun. 7, 2017.

(51) Int. Cl.
| | | |
|---|---|---|
| *B25B 11/00* | (2006.01) | |
| *B05B 13/02* | (2006.01) | |
| *F16M 13/02* | (2006.01) | |
| *F16M 11/04* | (2006.01) | |
| *F16B 1/00* | (2006.01) | |

(52) U.S. Cl.
CPC ............ *B25B 11/002* (2013.01); *B05B 13/02* (2013.01); *F16B 1/00* (2013.01); *F16M 11/041* (2013.01); *F16M 13/022* (2013.01); *F16B 2001/0035* (2013.01)

(58) Field of Classification Search
CPC ............ B05B 13/02; F16B 2001/0035; F16M 11/041; F16M 13/022; F16M 37/04; F16M 13/02
USPC .............................................................. 269/8
See application file for complete search history.

(56) References Cited

U.S. PATENT DOCUMENTS

| | | | | |
|---|---|---|---|---|
| 3,895,332 A | * | 7/1975 | Box ...................... | B65D 25/22 335/286 |
| 2017/0095825 A1 | * | 4/2017 | Manabe ................ | B05B 12/006 |
| 2017/0355309 A1 | * | 12/2017 | Hamada .................... | B60R 1/06 |

* cited by examiner

*Primary Examiner* — Joseph J Hail
*Assistant Examiner* — J Stephen Taylor
(74) *Attorney, Agent, or Firm* — Honigman LLP

(57) ABSTRACT

A system for retaining a vehicular component for painting includes a magnetic fixturing element configured to detachably attach at the vehicular component that is to be painted. The magnetic fixturing element comprises a magnetic element. A fixture includes metallic structure that is configured to engage the magnetic fixturing element. With the fixture engaged with the magnetic fixturing element, the component is magnetically retained at the fixture for painting. With the fixture engaged with the magnetic fixturing element, the component is painted by a painting device of the system. After the component that is magnetically retained at the fixture is painted, the magnetic fixturing element is removable from the component and reusable on other components to be magnetically retained at the fixture and painted.

8 Claims, 3 Drawing Sheets

VEHICLE COMPONENT PAINTING SYSTEM AND METHOD

CROSS REFERENCE TO RELATED APPLICATION

The present application is related to U.S. provisional application Ser. No. 62/516,278, filed Jun. 7, 2017, which is hereby incorporated herein by reference in its entirety.

FIELD OF THE INVENTION

The present invention relates generally to the field of painting automotive components, such as painting mirror casings for rearview mirror assemblies and painting exterior door handle portions.

BACKGROUND OF THE INVENTION

Typically, parts are designed without a consistent strategy as to how the part will be fixtured in order to have paint applied. As a result, each part ends up with a unique fixture/rack specifically designed for that part and generally each fixture cannot be used for any other part. Because paint facilities are very expensive, they must be loaded with many different parts in order to support a profitable business model. As an end result, typical paint lines are supported by hundreds if not thousands of part specific racks that need to be stored, maintained and cleaned when not in service.

SUMMARY OF THE INVENTION

The present invention provides a process and system for holding or fixturing various plastic parts with a common fixture during the painting process. The system includes providing a magnetic element at each part or component and magnetically holding the part in place during the painting process. The magnetic elements may be removed from the parts after painting and can be reused on other parts.

These and other objects, advantages, purposes and features of the present invention will become apparent upon review of the following specification in conjunction with the drawings.

DESCRIPTION OF THE PREFERRED EMBODIMENTS

Figure 1:
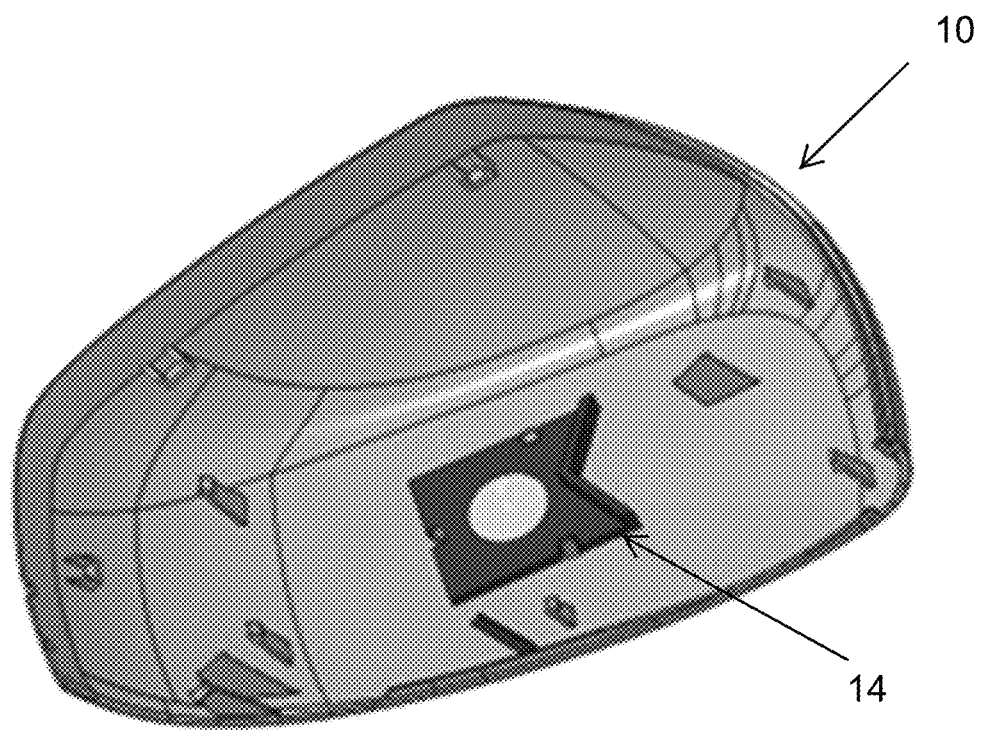
FIG. 1 is a perspective view of an exterior rearview mirror assembly with a magnetic fixturing element in accordance with the present invention.
Figure 2:
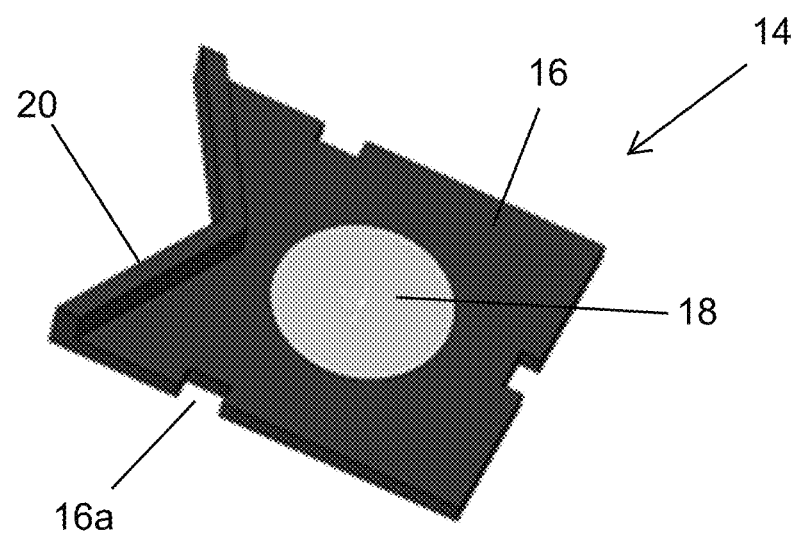
FIG. 2 is a perspective view of the magnetic fixturing element shown in FIG. 1.
Figure 3:
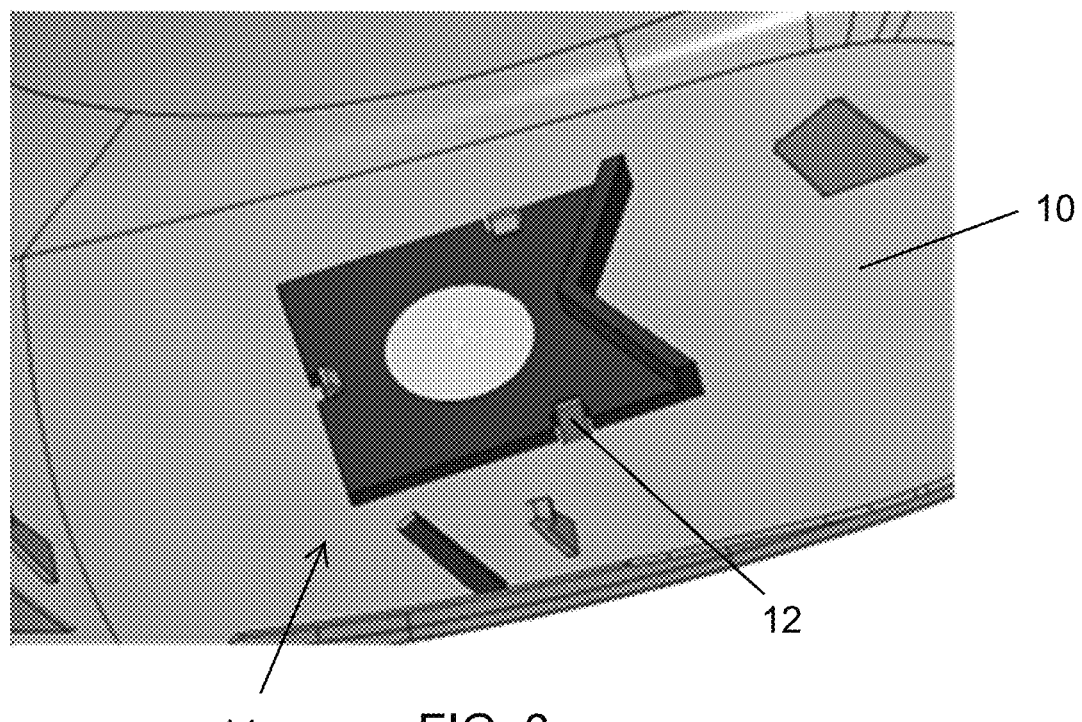
FIG. 3 is an enlarged perspective view of the mirror assembly and magnetic fixturing element of FIG. 1.
Figure 4:
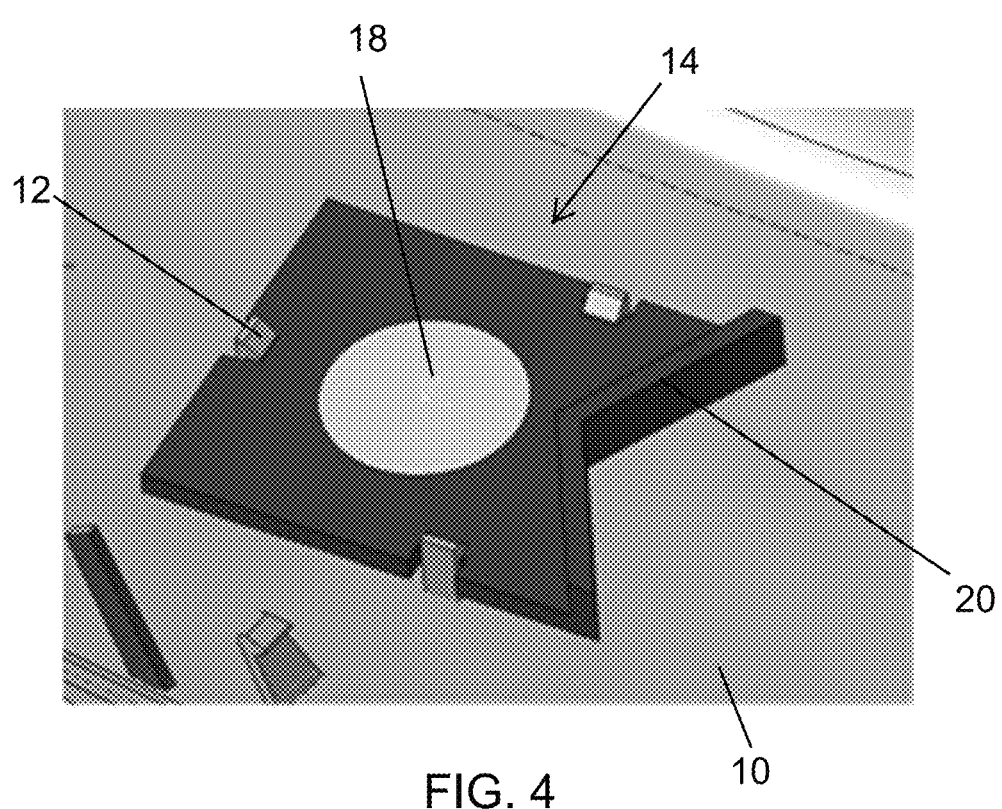
FIG. 4 is another enlarged perspective view of the mirror assembly and magnetic fixturing element of FIG. 1.

Referring now to the drawings and the illustrative embodiments depicted therein, an exterior rearview mirror assembly for a vehicle includes a mirror reflective element received in and/or supported at or by a mirror shell or casing 10 (FIG. 1). During the mirror assembly process or manufacturing process, the mirror casing 10 is painted by fixturing the casing in a painting chamber. The mirror casing 10 includes a plurality of tabs 12 (such as three tabs shown in FIGS. 1, 3 and 4) that protrude from the interior surface of the casing for snap-attaching a magnetic fixturing element 14 at the mirror casing. The painting facility includes a plurality of fixtures or posts and the mirror casing, with the magnetic fixturing element 14 attached thereat, is magnetically retained at the fixtures during the painting process, as discussed below. The magnetic fixturing element 14 is configured to mate with the paint fixture to hold the mirror casing at the proper or desired or selected orientation during the painting process, as also discussed below. For example, the fixture for a part may comprise a single post with a metallic element (or magnet) at an end thereof for magnetically engaging the magnet (or metallic element) at the magnetic fixturing element attached at the part. The post may comprise a narrow post that supports the part or component with minimal interference in paint spray at the part.

In the illustrated embodiment, the interior or Class C surface of the mirror casing 10 includes three tabs 12 for snap attaching the magnetic fixturing element 14 at the mirror casing in the desired or appropriate or selected orientation. The magnetic fixturing element 14 comprises a plastic attaching portion 16 that is configured to snap attach at the tabs 12 (and may have recesses or notches 16a formed thereat to facilitate proper positioning of the element at the vehicular component or part to be painted). Optionally, the part may include a recess that has a profile that generally corresponds to the profile or shape of the attaching portion of the fixturing element to facilitate proper positioning of the element at the part to be painted.

The magnetic fixturing element 14 includes a magnet or magnetic element 18 that is fixedly attached at or adhered or molded in the attaching portion 16. For example, the plastic or polymeric attaching portion may be molded over or partially over the magnet to attach or retain the magnet relative to the molded attaching portion. The magnet 18 may comprise any suitable magnetic element or material, preferably a material that can withstand high temperatures and other environments that it may be exposed to during the washing and painting and drying/curing cycles or processes.

The magnetic fixturing element 14 also includes an orientation element or tab or flange or structure 20, which is configured to engage a corresponding shape or structure at the paint facility fixture to assist in positioning and orienting the part in the paint facility in the desired or appropriate or selected orientation relative to the paint facility fixture. Optionally, the part 10 may include a recess or receiving portion and may include an orientation tab or structure, whereby the receiving portion receives a magnet therein and the orientation element is provided by the part itself (in which case, only the magnet is detachably attached for positioning the part and magnetically retaining the part at a fixture, and only the magnet is detached from the part after the part is painted).

Thus, a part 10 that is to be painted is formed with an attaching or receiving portion to accommodate or receive or detachably attach to a magnetic fixturing element (with the attaching or receiving portion or structure molded at the interior or Class C surface or non-Class A surface of the part). The magnetic fixturing element is then detachably attached at the receiving portion of the part, and the part is moved on to the painting process or facility, where the part is fixtured at a respective post or fixturing element that holds the part in place (and in the desired orientation) for the painting process (that paints the Class A surface of the part). After the painting process is completed, the painted parts are removed from the fixtures and the magnetic fixturing elements are detached from the painted parts. The magnetic fixturing elements are then usable on other parts for painting (and optionally may be cleaned after use to avoid any paint buildup on the elements).

Figure 5:
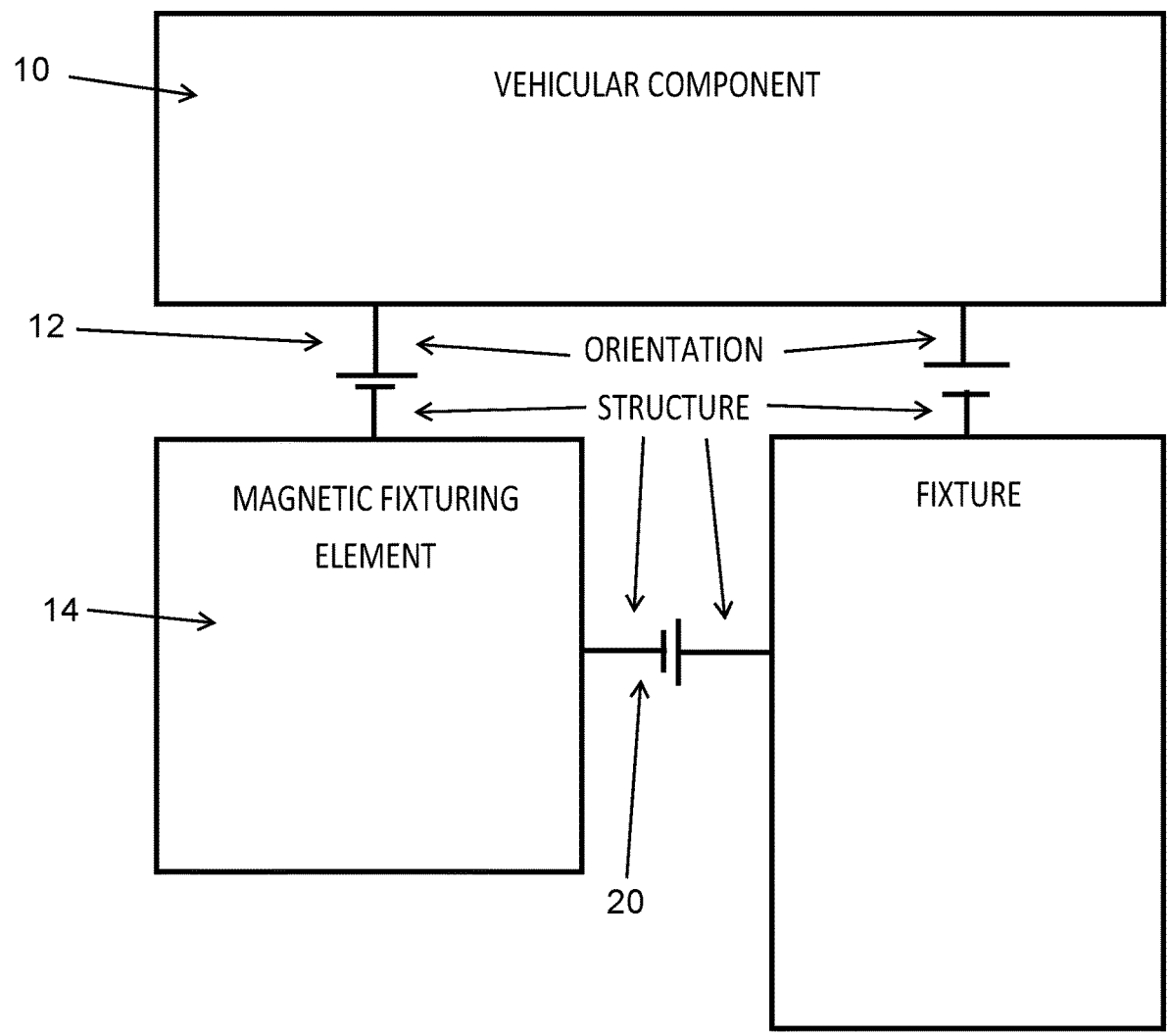
FIG. 5 is a block diagram depicting the orientation structure on the component, the orientation structure at the fixture and the orientation structure at the fixturing element.

The part and/or the magnetic fixturing element and/or the fixture may have orientation structure for engaging corresponding structure of one or more of the other elements, whereby the magnetic fixturing element may be attached at the part in a predetermined orientation and/or the magnetic fixturing element (and the part) may be magnetically retained at the fixture in a predetermined orientation. For example, the magnetic fixturing element may snap attach at the part in a particular orientation determined by elements or tabs or the like of the part and the magnetic fixturing element, while the magnetic fixturing element may engage the fixture in a particular orientation determined by elements or tabs or the like of the magnetic fixturing element and the fixture. The part may also include orientation structure that engages part of the fixture when the magnetic fixturing element is magnetically retained at the fixture to further assist in establishing the desired or appropriate orientation of the part at the fixture for painting (see FIG. 5). The magnetic fixturing element includes a magnetic element that may be a magnet or a ferromagnetic material, and the fixture may comprise a corresponding magnetic element that is magnetically attracted to the magnetic element of the magnetic fixturing element.

Although shown and described as the parts having a magnet detachably attached thereto for fixturing during the painting process, the system may optionally have a magnetic element or metallic element (that is magnetic) detachably attached at the parts, with a magnet disposed at the paint facility fixture (and optionally built into the posts or structure of the fixture), while remaining within the spirit and scope of the present invention.

The present invention thus provides a universal paint rack with steel (or other magnetic material) attachment posts (which may have a flat surface or a concave—convex design to draw parts into a fixed position). Pockets or retaining elements are molded on the Class C surface of the molded mirror caps or snap tabs may be provided to hold in a magnetic element or magnet. The magnet is inserted into the pocket or snap attached at the tabs to temporarily and removably attach the magnet at the part that is to be painted. Optionally, a concave or convex magnet may be used to compliment the rack post design. Optionally, and desirably, the pocket in the molded parts is designed with posts in clocked or defined positions, and the fixture may be correspondingly formed so that, when the part is disposed at and magnetically retained at the fixture, the part is held in the proper or desired orientation for paint efficiency. The part is then held or fixtured in the paint facility such that at least the exterior or Class A surface is painted. The magnetic elements can be popped out or removed from the painted part and reused on other parts.

The magnets or magnetic elements comprise a material that can withstand the wash tanks and oven temperatures (used for curing/drying the paint after the paint process), and that does not interfere with quality due to static paint transfer and the like (optionally, the elements may be ceramic coated or the like). The rack design may include bars or posts for holding the parts (with the quantity per rack based on the parts' sizes and profiles and the like (optionally, two or more different rack designs may be implemented to incorporate all configurations).

By providing a universal fixture for painting various components or parts (and reusing the magnets), the method and system of the present invention may eliminate up to or more than about $250,000 per year in paint rack capital, may eliminate up to or more than about $250,000 per year in rack repair costs, and may reduce up to or more than about $500,000 per year in labor costs. The method and system of the present invention may improve paint system efficiencies by reducing the amount of racks loaded into and out of the paint system or chamber or facility. The method and system of the present invention may reduce paint scrap from rack damage/handling and may eliminate the need for excess storage of racks internal/in trailers.

The method and system of the present invention thus incorporates a common strategy that allows for paint fixtures to become more universal. This strategy will affect the part design and the fixture design as well as the actual paint process design. Although shown and described for use in the painting of an exterior rearview mirror casing, the universal fixturing concept and strategy of the present invention is suitable for use on various interior and exterior mirror components and vehicle door handle components, and many other painted parts creating similar if not greater savings opportunities.

Changes and modifications in the specifically described embodiments may be carried out without departing from the principles of the present invention, which is intended to be limited only by the scope of the appended claims as interpreted according to the principles of patent law.

The invention claimed is:

1. A method for retaining a vehicular component for painting, said method comprising:
   providing a vehicular component to be painted, wherein the vehicular component is configured for use on a vehicle;
   providing a magnetic fixturing element, wherein the magnetic fixturing element comprises a magnetic element;
   detachably attaching the magnetic fixturing element at the component that is to be painted;
   providing a fixture;
   positioning the component at the fixture such that the magnetic fixturing element engages a structure of the fixture to magnetically retain the component at the fixture;
   wherein the component comprises orientation structure that engages corresponding structure at the fixture, and wherein positioning the component at the fixture comprises positioning the component at the fixture and engaging the orientation structure with the corresponding structure at the fixture so that the component is magnetically retained at a selected orientation relative to the fixture;
   painting the component magnetically retained at the fixture; and
   after the component that is magnetically retained at the fixture is painted, removing the magnetic fixturing element from the component and reusing the magnetic fixturing element on another vehicular component to be painted.

2. The method of claim 1, wherein the magnetic fixturing element comprises orientation structure that engages corresponding structure at the fixture, and wherein positioning the component at the fixture comprises positioning the component at the fixture and engaging the orientation structure of the magnetic fixturing element with the corresponding structure at the fixture so that the component is magnetically retained at the selected orientation relative to the fixture.

3. The method of claim 1, wherein detachably attaching the magnetic fixturing element at the component comprises snap-attaching the magnetic fixturing element at the component.

4. The method of claim 1, wherein providing a vehicular component to be painted comprises providing a mirror casing for a vehicular exterior rearview mirror assembly.

5. The method of claim 4, wherein detachably attaching the magnetic fixturing element comprises detachably attaching the magnetic fixturing element at an interior surface of the mirror casing that is to be painted.

6. The method of claim 5, wherein painting the component comprises painting an exterior surface of the mirror casing that is retained at the fixture.

7. A method for retaining a vehicular component for painting, said method comprising:
- providing a vehicular component to be painted, wherein the vehicular component is configured for use on a vehicle;
- providing a magnetic fixturing element, wherein the magnetic fixturing element comprises a magnetic element;
- detachably snap-attaching the magnetic fixturing element at the component that is to be painted;
- providing a fixture;
- positioning the component at the fixture such that the magnetic fixturing element engages a metallic structure of the fixture to magnetically retain the component at the fixture;
- wherein the magnetic fixturing element comprises first orientation structure that engages corresponding structure at the component, and wherein positioning the magnetic fixturing element at the component comprises positioning the magnetic fixturing element at the component and engaging the first orientation structure with the corresponding structure at the component so that the magnetic fixturing element snap-attaches at the component at a selected orientation relative to the component;
- wherein the magnetic fixturing element comprises second orientation structure that engages corresponding structure at the fixture, and wherein positioning the component at the fixture comprises positioning the component at the fixture and engaging the second orientation structure with the corresponding structure at the fixture so that the component is magnetically retained at a selected orientation relative to the fixture;
- wherein the component comprises third orientation structure that engages other corresponding structure at the fixture, and wherein positioning the component at the fixture comprises positioning the component at the fixture and engaging the third orientation structure with the other corresponding structure at the fixture so that the component is magnetically retained at the selected orientation relative to the fixture;
- painting the component magnetically retained at the fixture; and
- after the component that is magnetically retained at the fixture is painted, removing the component and magnetic fixturing element from the fixture and removing the magnetic fixturing element from the component and reusing the magnetic fixturing element on another vehicular component to be painted.

8. The method of claim 7, wherein providing a vehicular component to be painted comprises providing a mirror casing for a vehicular exterior rearview mirror assembly, and wherein detachably snap-attaching the magnetic fixturing element comprises detachably snap-attaching the magnetic fixturing element at an interior surface of the mirror casing that is to be painted, and wherein painting the component comprises painting an exterior surface of the mirror casing that is retained at the fixture.

* * * * *